US010375889B2

(12) United States Patent
Figger et al.

(10) Patent No.: US 10,375,889 B2
(45) Date of Patent: Aug. 13, 2019

(54) DUAL BELT CONVEYOR FOR AGRICULTURAL MACHINE

(71) Applicant: AGCO Corporation, Hesston, KS (US)

(72) Inventors: Robert L. Figger, Hesston, KS (US); Robert A. Matousek, Valley Center, KS (US); Shane A. Bollinger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 201 days.

(21) Appl. No.: 15/529,407

(22) PCT Filed: Dec. 7, 2015

(86) PCT No.: PCT/US2015/064193
§ 371 (c)(1),
(2) Date: May 24, 2017

(87) PCT Pub. No.: WO2016/094270
PCT Pub. Date: Jun. 16, 2016

(65) Prior Publication Data

US 2017/0359958 A1 Dec. 21, 2017

Related U.S. Application Data

(60) Provisional application No. 62/090,237, filed on Dec. 10, 2014.

(51) Int. Cl.
*A01D 61/00* (2006.01)
*A01D 57/20* (2006.01)
(Continued)

(52) U.S. Cl.
CPC ........... *A01D 61/006* (2013.01); *A01D 34/64* (2013.01); *A01D 43/07* (2013.01); *A01D 57/20* (2013.01); *A01D 61/02* (2013.01)

(58) Field of Classification Search
CPC ...... A01D 61/006; A01D 43/07; A01D 34/64; A01D 61/02; A01D 57/20; B65G 15/14; B65G 21/02; B65G 2812/018
See application file for complete search history.

(56) References Cited

U.S. PATENT DOCUMENTS 209,639 A * 11/1878 Ainsworth ............ B65G 37/00 198/592
582,798 A * 5/1897 Pridmore ............... A01D 57/20 56/181

(Continued)

FOREIGN PATENT DOCUMENTS

DE 10 2013 105073 A1 11/2014

OTHER PUBLICATIONS

European Patent Office, International Search Report for International Patent Application No. PCT/US2015/064193, dated Mar. 14, 2016.

(Continued)

*Primary Examiner* — Arpad Fabian-Kovacs

(57) ABSTRACT

A dual conveyor assembly for a windrower includes upper and lower conveyors. Each conveyor includes an endless conveyor element and rotatable supports spaced along a longitudinal conveyor path and entrained by the endless conveyor element. The endless conveyor elements define vertically spaced opposed runs that define the longitudinal conveyor path therebetween. The opposed runs are operable to be driven together to move a flow of severed plant material along the path. At least one of the opposed runs is shiftable relative to the other opposed run in an upright direction, while the runs are driven together, such that the opposed runs remain in moving engagement with the flow of severed plant material as the amount of severed plant material passing between the opposed runs varies.

16 Claims, 7 Drawing Sheets

(51) Int. Cl.

| | |
|---|---|
| ***A01D 34/64*** | (2006.01) |
| ***A01D 43/07*** | (2006.01) |
| ***A01D 61/02*** | (2006.01) |

(56) References Cited

U.S. PATENT DOCUMENTS 1,380,636 A * 6/1921 Clove .................. A01D 61/008 460/114
1,387,680 A 8/1921 Baker
2,841,945 A * 7/1958 Brenner ................. A01D 41/00 460/111
3,170,564 A * 2/1965 Gatto ...................... B21C 35/02 198/626.5
3,581,876 A * 6/1971 Keith ...................... B65B 61/24 100/151
3,942,307 A * 3/1976 Quick .................... A01D 45/10 56/13.9
3,988,098 A * 10/1976 Kato ....................... B29C 43/22 425/224
4,510,740 A * 4/1985 Foster .................... A01D 45/16 414/26
4,722,175 A * 2/1988 Hobhouse ............ A01D 51/002 56/327.1
4,776,451 A * 10/1988 Gaddis ................... B65G 15/16 198/626.3
5,044,240 A * 9/1991 Fischer ................ B26D 7/0625 83/161
5,083,417 A * 1/1992 Jeronimidis ........... A01D 44/00 198/512
5,244,196 A * 9/1993 Walter ................... B65H 29/12 270/46
5,272,860 A 12/1993 Baril et al.
5,400,577 A * 3/1995 Duncan .................. A01D 45/16 414/26
5,458,051 A * 10/1995 Alden ................... A47J 37/044 198/626.5
5,497,605 A * 3/1996 Underwood ........... A01D 34/30 56/14.6
5,799,474 A * 9/1998 Ingram ................ A01D 89/003 56/119
5,924,551 A 7/1999 Radmall
6,032,446 A * 3/2000 Gola .................... A01D 46/084 100/151
6,226,967 B1 * 5/2001 Staiger ................. A01D 43/077 56/14.5
8,186,502 B2 * 5/2012 Mackin .................. B65G 15/26 198/313
2005/0120696 A1 6/2005 Lohrentz et al.
2007/0251203 A1 * 11/2007 Coers ..................... A01D 61/02 56/181
2010/0031622 A1 2/2010 Frey
2013/0036921 A1 * 2/2013 Horstmann ......... A01F 15/0705 100/5
2014/0260166 A1 9/2014 Schloesser

OTHER PUBLICATIONS

European Patent Office, International Search Report for related European Patent Application No. 18153283.9, dated May 3, 2018.

UK Intellectual Property Office, International Search Report for related UK Application No. GB15080484, dated Oct. 30, 2015.

* cited by examiner

DUAL BELT CONVEYOR FOR AGRICULTURAL MACHINE

RELATED APPLICATION

Under provisions of 35 U.S.C. § 119(e), Applicants claim the benefit of U.S. Provisional Application No. 62/090,237, entitled DUAL BELT CONVEYOR FOR AGRICULTURAL MACHINE and filed Dec. 10, 2014, which is incorporated herein by reference.

BACKGROUND

Field of the invention

The present invention relates generally to agricultural conveyors. More specifically, embodiments of the present invention concern a dual belt conveyor for an agricultural machine.

Discussion of Prior Art

Various types of conveying mechanisms are used with agricultural machines to move grain and other plant material. For instance, powered augers are commonly used to move grain and other plant material along the axis of the auger. Draper belt conveyors are used to move plant material along the lateral length of a harvesting header.

However, prior art agricultural conveying systems have various deficiencies. For instance, conventional powered augers provide a relatively small material flow rate when compared to draper belt conveyors. Known draper belt conveyors are also problematic because such conveyors permit conveyed material to prematurely fall from the edges of the conveyor.

SUMMARY

The following brief summary is provided to indicate the nature of the subject matter disclosed herein. While certain aspects of the present invention are described below, the summary is not intended to limit the scope of the present invention.

Embodiments of the present invention provide a dual belt conveyor that does not suffer from the problems and limitations of the prior art conveyors set forth above.

A first aspect of the present invention concerns a dual conveyor assembly operable to move severed plant material. The dual conveyor assembly broadly includes upper and lower conveyors. Each of the conveyors includes an endless conveyor element and rotatable supports spaced along a longitudinal conveyor path and entrained by the endless conveyor element. The endless conveyor elements define vertically spaced opposed runs that define the longitudinal conveyor path therebetween, with the opposed runs operable to be driven together to move a flow of severed plant material along the path. At least one of the opposed runs is shiftable relative to the other opposed run in an upright direction, while the runs are driven together, such that the opposed runs remain in moving engagement with the flow of severed plant material as the amount of severed plant material passing between the opposed runs varies.

A second aspect of the present invention concerns a windrower operable to be advanced along a field to cut a forage plant crop and to transport a flow of severed plant material to a location spaced laterally from the windrower. The windrower broadly includes a header and a dual conveyor assembly. The header is supported to sever the forage plant crop and discharge the severed plant material. The dual conveyor assembly is located rearwardly of the header to collect severed plant material and transport a flow of severed plant material to the location. The dual conveyor assembly includes upper and lower conveyors, each including an endless conveyor element and rotatable supports spaced along a longitudinal conveyor path and entrained by the endless conveyor element. The endless conveyor elements define vertically spaced opposed runs that define the longitudinal conveyor path therebetween, with the opposed runs operable to be driven together to move the flow of severed plant material along the path. At least one of the opposed runs is shiftable relative to the other opposed run in an upright direction, while the runs are driven together, such that the opposed runs remain in moving engagement with the flow of severed plant material as the amount of severed plant material passing between the opposed runs varies.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 1:
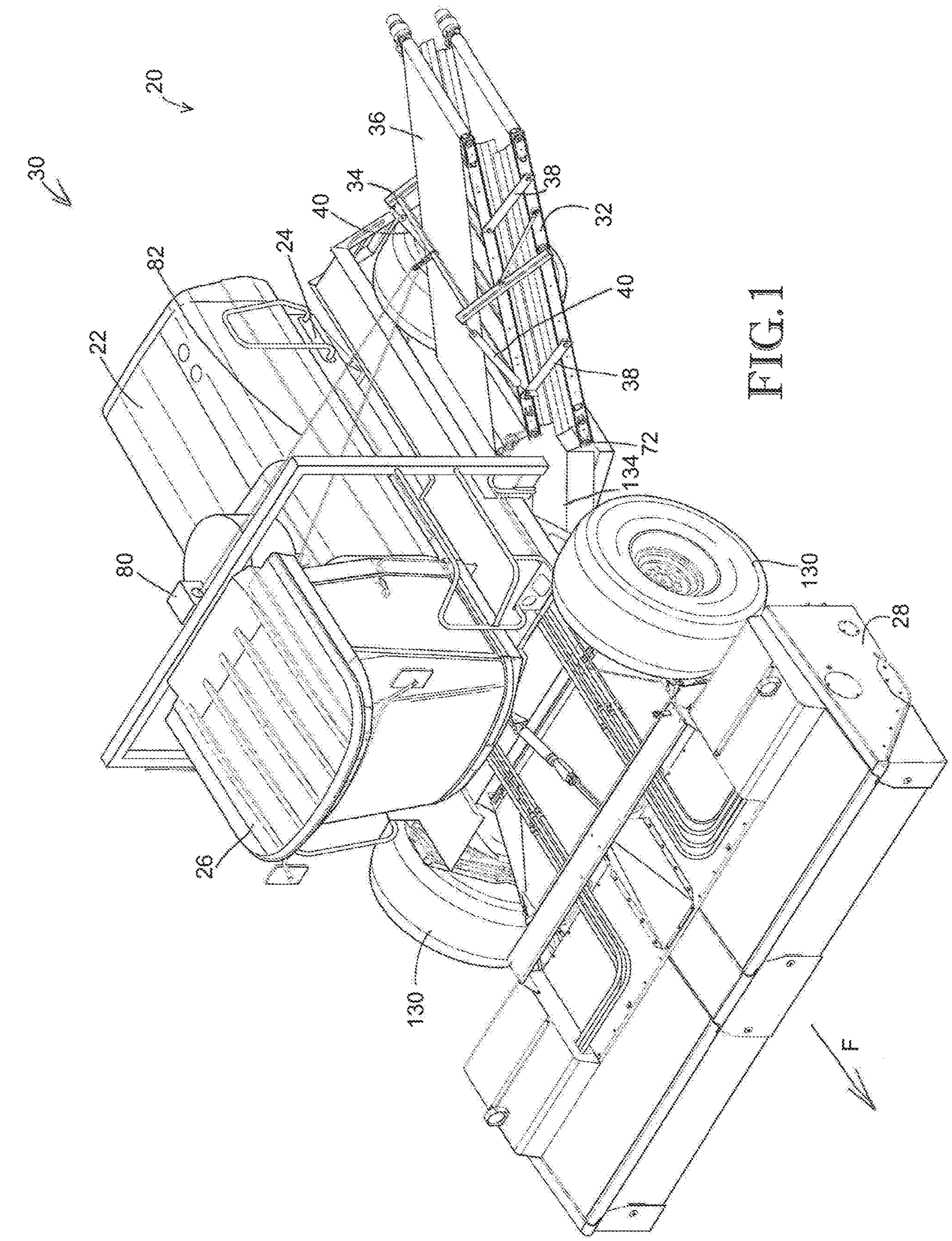
FIG. 1 is an upper perspective of a silage cutting vehicle constructed in accordance with a preferred embodiment of the present invention, showing a windrower and conveyor assembly of the vehicle, with the windrower including a rolling chassis, a cab mounted on the chassis, and a header.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 2:
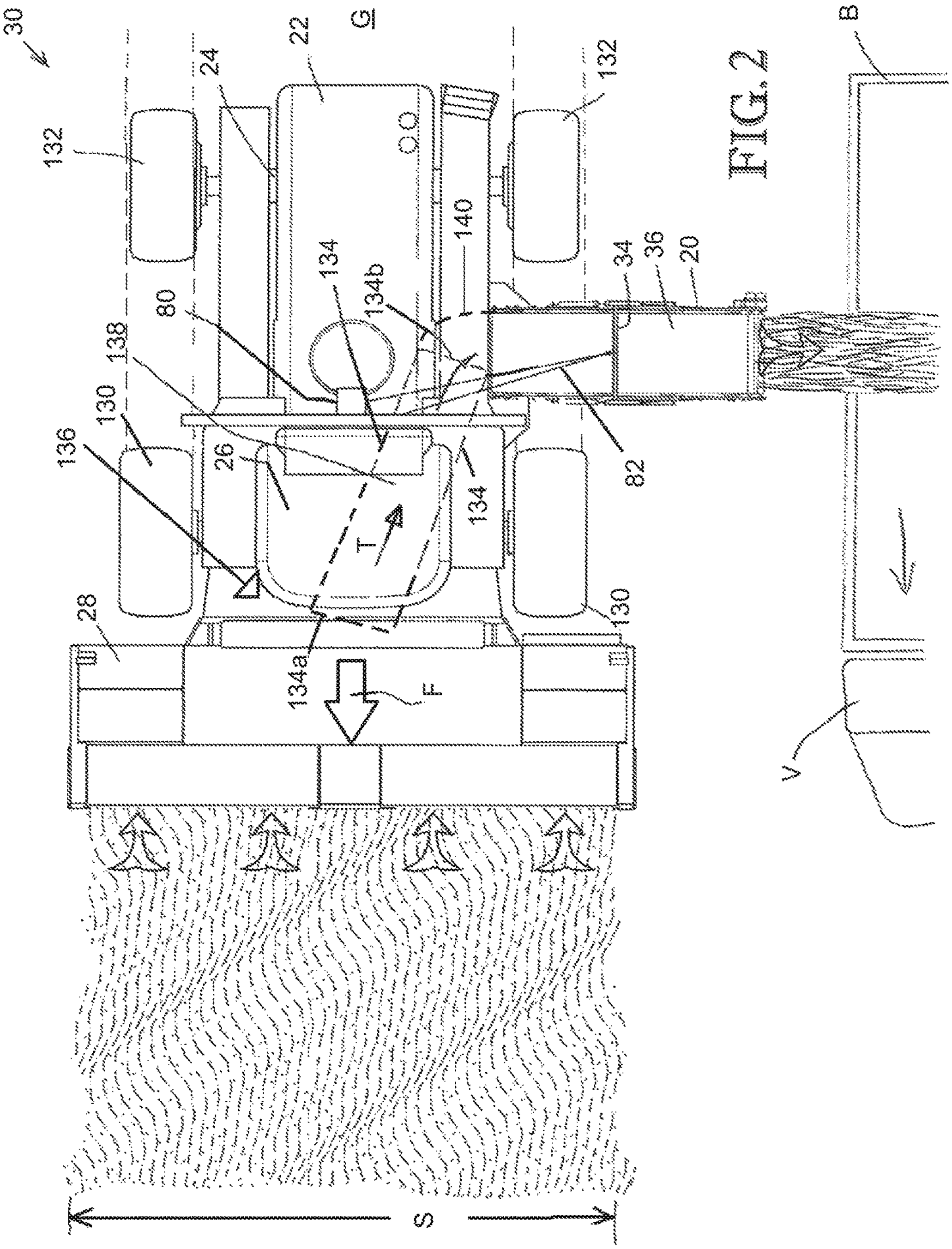
FIG. 2 is a top view of the silage cutting vehicle shown in FIG. 1, showing the vehicle being advanced along a field, with the header severing a swath of forage plants as the header is advanced by the powered chassis, and showing a transfer path along which the severed forage plants are guided from the header outlet to the inlet opening of the conveyor assembly.

Turning initially to FIGS. 1 and 2, a dual belt conveyor assembly 20 is constructed in accordance with a preferred embodiment of the present invention. In the illustrated embodiment, the conveyor assembly 20 is mounted to and used with a windrower 22. The windrower 22 is conventional and includes a powered chassis 24, a cab 26, and a header 28. As will be discussed, the illustrated conveyor 20 is used with the windrower 22 to provide a self-propelled silage cutting vehicle 30.

In the usual manner, the header 28 is preferably used to sever a swath S of forage plants as the header 28 is advanced over the ground G by the powered chassis 24. The header 28 also discharges the severed plant material rearwardly from a header outlet O. Furthermore, the header 28 is shiftably supported by the powered chassis 24 to move up and down as the header 28 moves along a forward travel direction F across the ground G to cut forage plants. While the illustrated header 28 is a rotating disc header, it is within the scope of the present invention for the windrower 22 to use an alternative header, such as a sickle header.

Although illustrated in use with the windrower 22, it will be appreciated that features of the conveyor assembly 20 can be used in other applications. Importantly, the conveyor assembly 20 could be implemented in any of various agricultural machines. For instance, aspects of the conveyor assembly 20 could be configured to operate as the feederhouse of a grain harvesting machine, where the conveyor moves severed crop material from a header to the threshing and separating system of the harvester. Also, the illustrated conveyor assembly 20 could be used as a grain conveyor to convey harvested grain (e.g., as an offloading conveyor to offload clean grain from a harvester to a grain hauling vehicle). The conveyor assembly 20 preferably includes a lower belt conveyor 32, a conveyor support yoke 34, an upper belt conveyor 36, links 38, and springs 40.

Turning to FIGS. 3-7, the lower belt conveyor 32 is powered and cooperates with the upper belt conveyor 36 to move severed plant material along a longitudinal conveyor path P. The lower belt conveyor 32 preferably includes a lower conveyor frame 42, rollers 44, an endless belt 46, and a hydraulic motor 48.

The lower conveyor frame 42 includes a pair of side rails 50, upright side plates 52 fixed to the side rails 50, cross beams 54 that interconnect the side rails 50, and a dividing plate (not shown) that spans the side rails 50 and extends the length of the lower conveyor frame 42.

The rollers 44 are rotatably mounted to the side rails 50 with respective roller shafts **58*a,b* so that the rollers 44 extend between the side rails 50. The rollers 44 are mounted adjacent to respective inlet and outlet ends 60, 62 of the lower conveyor frame 42. The belt 46 extends about the rollers 44 and presents inlet and outlet end margins 64, 66 that are supported by the rollers 44 adjacent respective ends 60, 62 of the frame 42. The belt 46 presents upper and lower runs 68, 70 that extend longitudinally between the rollers 44. The belt 46** preferably includes an elastomeric resin material and one or more reinforcing members (not shown) that extend longitudinally within the resin material.

While the illustrated belt 46 is preferred to move severed plant material, an alternative endless conveyor element could also be used as part of the conveyor 32. For instance, for some aspects of the present invention, the conveyor 32 could include one or more endless chains (not shown) to carry the severed plant material. In such a configuration, the conveyor 32 would likely need to include a floor (not shown) directly underlying and in sliding contact with the upper run of the chain.

Although the illustrated belt-and-roller configuration is used to frictionally drive the belt 46, it is within the scope of the present invention where an alternative mechanism is used to drive the belt 46. For instance, the belt 46 could include a continuous series of cog elements that are drivingly engaged by a powered sprocket (not shown) mounted in engagement with the respective end margin 64, 66 of the belt 46.

The motor 48 is preferably used to drive the belt 46. The illustrated motor 48 is mounted to the lower conveyor frame 42 adjacent the outlet end 62. The motor 48 includes a motor shaft (not shown) that is drivingly connected to the roller shaft **58*a*. Thus, rotation of the motor shaft causes rotation of the roller shaft 58*a* and the roller 44 attached directly to the motor shaft. Such rotation of the motor shaft also causes longitudinal movement of the belt 46 along an endless path and rotation of the other roller 44**.

However, it will be appreciated that the motor 48 could be alternatively mechanically coupled to the roller shaft **58*a*. For instance, the lower belt conveyor 32 could include a transmission (e.g., a gear drive, a belt-and-pulley system, or a chain-and-sprocket system) that drivingly interconnects the roller shaft 58*a*** and motor shaft (e.g., to provide a speed step-up or step-down mechanism).

While the illustrated motor 48 is preferably a hydraulic motor, an alternative drive motor, such as an electric motor or a combustion engine, could be used to drive the belt 46.

For some aspects of the present invention, the lower belt conveyor 32 could operate without being powered by a dedicated drive motor. For instance, the lower and upper belt conveyors 32, 36 could both be driven by the same motor. Yet further, the lower belt conveyor 32 could operate without being powered by a motor (i.e., where only the upper belt conveyor 36 is driven by a motor).

The illustrated lower belt conveyor 32 is preferably mounted to and supported by the powered chassis 24. The lower conveyor frame 32 is attached to the powered chassis 24 at a pivot joint 72 that permits the lower belt conveyor 32 to swing about a generally horizontal pivot axis A that extends along the longitudinal axis of the windrower 22. The conveyor assembly 20 is operable to be swung between an upright stored position (not shown), where the conveyor assembly 20 is generally upright, and a deployed position (see FIGS. 1 and 2), where the conveyor assembly 20 projects laterally relative to the powered chassis 24. As will be discussed, the vertical position of the lower belt conveyor 32 is controlled by positioning the conveyor support yoke 34.

The conveyor support yoke 34 comprises a rigid frame to support the belt conveyors 32, 36. The conveyor support yoke 34 preferably includes a pair of arms 74, a cross bar 76 that interconnects the arms 74, and braces 78. The arms 74 are preferably fixed to the lower conveyor frame 42 at locations between the inlet and outlet ends 60, 62. The braces 78 are fixed to the lower conveyor frame 42 and to respective arms 74 to provide a reinforced connection between the arms 74 and the lower conveyor frame 42.

The conveyor support yoke 34 is connected to the powered chassis 24 with a powered winch 80 that includes an adjustable-length wire rope 82. The length of the wire rope 82 is adjustable to selectively position the yoke 34. Because the yoke 34 supports the conveyors 32, 36, the length of wire rope 82 is adjustable to position the outlet end 62 of the conveyor 32 relative to the ground G.

Again, the upper belt conveyor 36 cooperates with the lower belt conveyor 32 to move severed plant material along the longitudinal conveyor path P. As will be discussed, the upper belt conveyor 36 is supported above the lower belt conveyor 32 by the links 38 and springs 40. The upper belt conveyor 36 preferably includes an upper conveyor frame 84, endmost rollers 86, intermediate roller 88, an endless belt 90, and a hydraulic motor 92 (see FIGS. 3 and 4).

Figure 3:
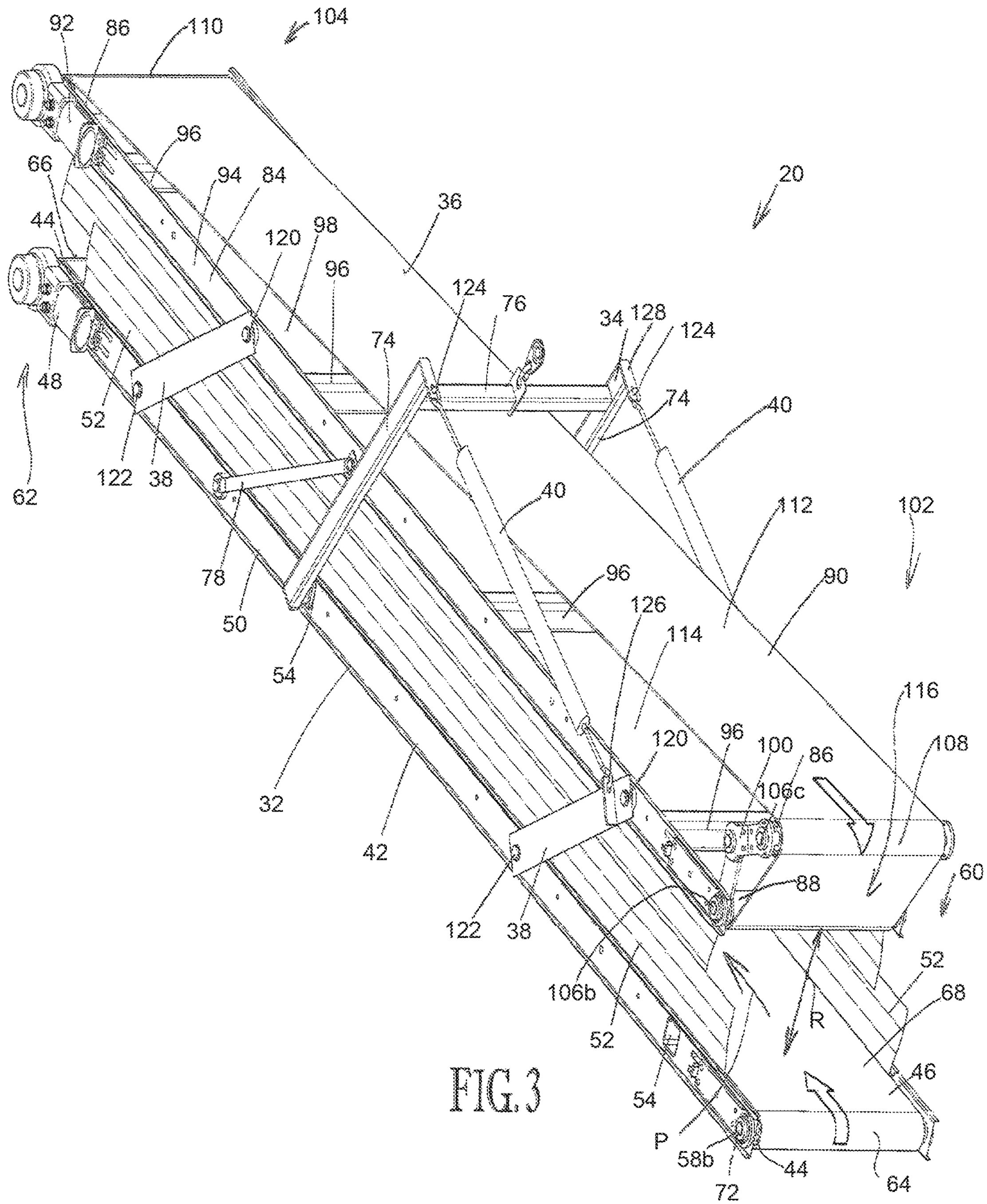
FIG. 3 is a rear perspective of the conveyor assembly shown in FIGS. 1 and 2, showing upper and lower belt conveyors, a support yoke, links, and springs of the conveyor assembly, with the support yoke being attached to the lower belt conveyor.

The upper conveyor frame 84 includes a pair of side rails 94, cross beams 96 that interconnect the side rails 94, and a dividing plate 98 that spans the side rails 94 and extends the length of the side rails 94 (see FIG. 3). The upper conveyor frame 84 further includes arms 100 that project from one end of the side rails 94 to present an inlet end 102 of the upper conveyor frame 84. The upper conveyor frame 84 also presents an outlet end 104. As will be discussed, the size and position of the arms 100 operate to form a relatively enlarged inlet opening of the conveyor assembly 20.

Figure 4:
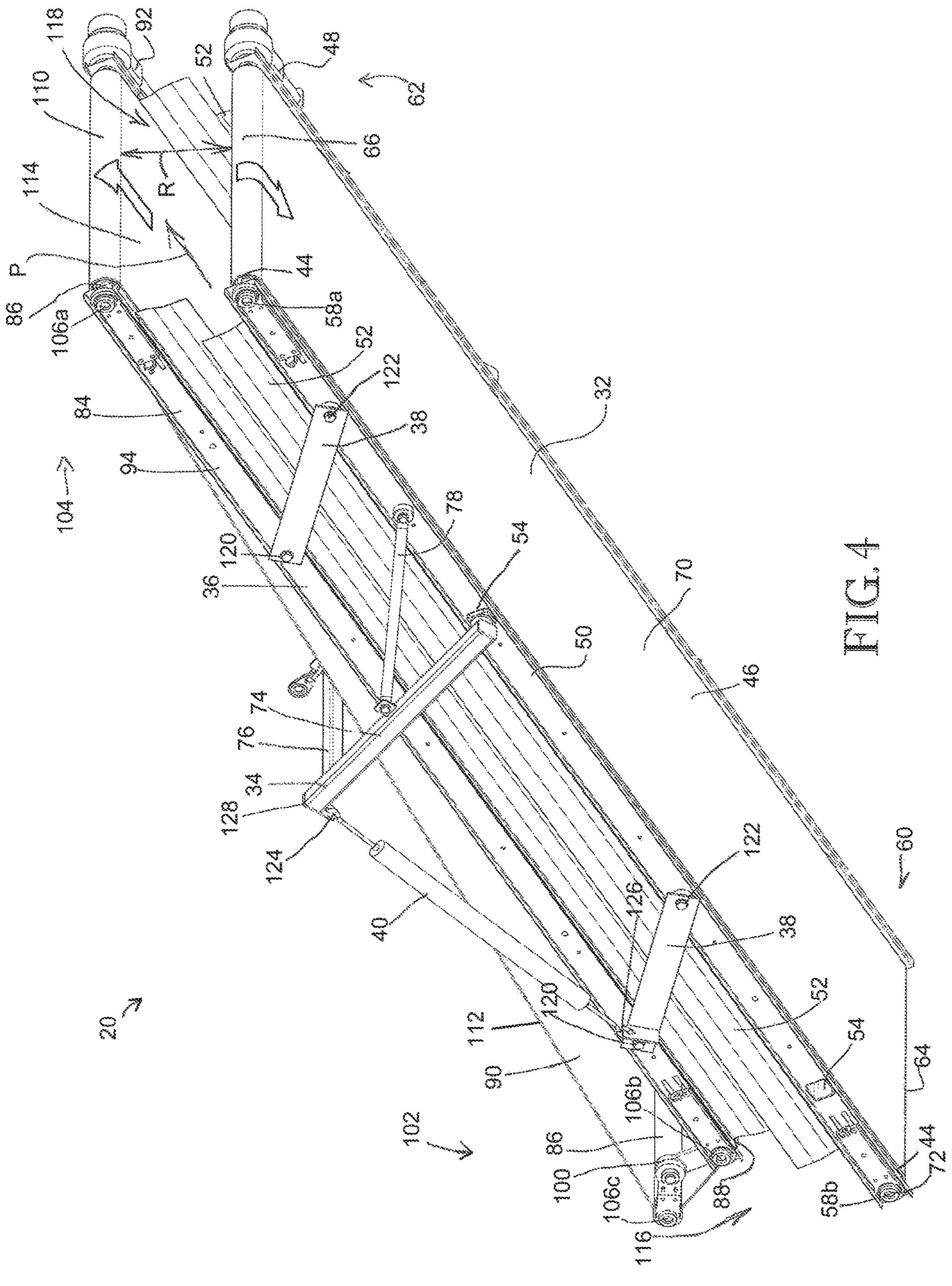
FIG. 4 is a front perspective of the conveyor assembly shown in FIGS. 1-3.

The rollers 86, 88 are rotatably mounted to the side rails 94 with respective roller shafts 106*a,b,c* so that the rollers 88 extend between the side rails 94 (see FIG. 4). The endmost rollers 86 are mounted adjacent to respective inlet and outlet ends 102,104 of the upper conveyor frame 84, and the intermediate roller 88 is positioned longitudinally between the rollers 86 and adjacent to the inlet end 102. The endmost roller 86 located adjacent the inlet end 102 is preferably spaced from the other roller 86 in the transverse direction. As will be discussed, the endmost roller 86 adjacent the inlet end 102 is positioned so that an inlet opening of the conveyor assembly 20 is larger than an outlet opening of the conveyor assembly 20.

The belt 90 extends about the rollers 86,88 and presents inlet and outlet end margins 108,110 that are supported by the rollers 86,88 adjacent to respective inlet and outlet ends 102,104. The belt 90 presents upper and lower runs 112,114 that extend longitudinally between the rollers 86, 88. The belt 90 preferably includes an elastomeric resin material and one or more reinforcing members (not shown) that extend longitudinally within the resin material.

While the illustrated belt 90 is preferred to move severed plant material, an alternative endless conveyor element could also be used as part of the conveyor 36. For instance, for some aspects of the present invention, the conveyor 36 could include one or more endless chains (not shown) to carry the severed plant material. In such a configuration, the conveyor 36 may include a floor (not shown) directly overlying and in sliding contact with the lower run of the chain.

Although the illustrated belt-and-roller configuration is used to frictionally drive the belt 90, it is within the scope of the present invention where an alternative mechanism is used to drive the belt 90. For instance, the belt 90 could include a continuous series of cog elements (not shown) that are drivingly engaged by a powered sprocket (not shown) mounted in engagement the belt 90 (e.g., where the sprocket is mounted in engagement with one of the end margins 108,110 of the belt 90).

The motor 92 is preferably used to drive the belt 90. The illustrated motor 92 is mounted to the upper conveyor frame 84 adjacent the outlet end 104. The motor 92 includes a motor shaft (not shown) that is drivingly connected to the roller shaft 106*a*. Thus, rotation of the motor shaft causes rotation of the roller shaft 106*a* and the roller 86 attached directly to the motor shaft. Such rotation of the motor shaft also causes longitudinal movement of the belt 90 along an endless path and rotation of the other rollers 86, 88.

However, it will be appreciated that the motor 92 could be alternatively mechanically coupled to the roller shaft 106*a*. For instance, the lower belt conveyor 32 could include a transmission (e.g., a gear drive, a belt-and-pulley system, or a chain-and-sprocket system) that drivingly interconnects the roller shaft 106*a* and motor shaft (e.g., to provide a speed step-up or step-down mechanism).

While the illustrated motor 92 is preferably a hydraulic motor, an alternative drive motor, such as an electric motor or a combustion engine, could be used to drive the belt 90.

For some aspects of the present invention, the upper belt conveyor 36 could operate without being powered by a dedicated drive motor. For instance, the lower and upper belt conveyors 32, 36 could both be driven by the same motor. Yet further, the upper belt conveyor 36 could operate without being powered by a motor (i.e., where only the lower belt conveyor 32 is driven by a motor).

The upper belt conveyor 36 is preferably positioned above the lower belt conveyor 32 so that the lower run 114 and the upper run 68 are generally adjacent to and opposed with one another. The opposed runs 68,114 cooperatively define the longitudinal conveyor path P therebetween. The runs 68,114 also define a run spacing dimension R measured between the runs 68,114 in a direction transverse to the conveyor path P. For a particular orientation of the links 38, the dimension R is preferably substantially constant from the intermediate roller 88 to the endmost roller 86 adjacent the outlet end 104. Furthermore, the opposed runs 68,114 preferably converge toward each other from the endmost roller 86 adjacent the inlet end 102 to the intermediate roller 88.

The opposed runs 68,114 also define inlet and outlet openings 116,118 of the dual conveyor assembly 20. The belt conveyors 32, 36 are also preferably arranged so that the lower run 114 and the upper run 68 are substantially aligned with one another in a lateral direction transverse to the longitudinal direction. Furthermore, the opposed runs 68,114 preferably have substantially the same lateral width. Consequently, corresponding side edges of the illustrated opposed runs 68,114 are generally laterally aligned with one another.

The illustrated belt conveyors 32, 36 are preferably positioned so that the longitudinal conveyor path P is substantially linear and extends upwardly from the inlet opening 116 to the outlet opening 118. However, it is within the scope of the present invention where the longitudinal conveyor path P is substantially horizontal or extends downwardly from the inlet opening 116 to the outlet 118. Yet further, it will be appreciated that the longitudinal conveyor path P could include one or more nonlinear segments and/or could include multiple segments that are not coaxial (i.e., where the segments are positioned off-axis relative to one another).

Again, each belt conveyor 32, 36 preferably includes a single endless belt 46, 90. However, it is within the scope of the present invention where each belt conveyor 32, 36 includes multiple belts to direct material along the conveyor path P. For instance, one or both of the belt conveyors 32,36 could include two or more belts positioned end-to-end to cooperatively provide the respective conveyor structure (e.g., where the conveyor path P includes path segments that extend in different directions).

The opposed runs 68,114 are both preferably driven in a downstream direction toward the outlet opening 118. More preferably, the opposed runs 68,114 are driven together at substantially the same speed in the downstream direction to move a flow of severed plant material along the longitudinal path P. However, it is within the scope of the present invention where the opposed runs 68,114 are driven in the opposite direction toward the inlet opening 116 (e.g., to clear out plant material clogged within the conveyor assembly 20).

As will be discussed, the upper belt conveyor 36 is shiftable relative to the lower belt conveyor 32 in an upright direction D transverse to the longitudinal path P to change the run spacing dimension R (see FIGS. 5-7). Furthermore, the upper belt conveyor 36 is shiftable in the upright direction D while the belt conveyors 32, 36 are driven together. In this manner, the opposed runs 68,114 remain in moving engagement with the flow of severed plant material as the amount of severed plant material passing between the opposed runs 68,114 varies.

Again, the upper belt conveyor 36 is preferably supported above the lower belt conveyor 32 by the links 38 and springs 40. Each link 38 preferably comprises an elongated unitary metal plate that presents opposite ends. Each link 38 is pivotally attached to the upper and lower conveyor frames 84, 42 at respective upper and lower pivot joints 120,122. As a result, each link 38 is pivotal relative to both of the upper and lower conveyor frames 84, 42.

Figure 5:
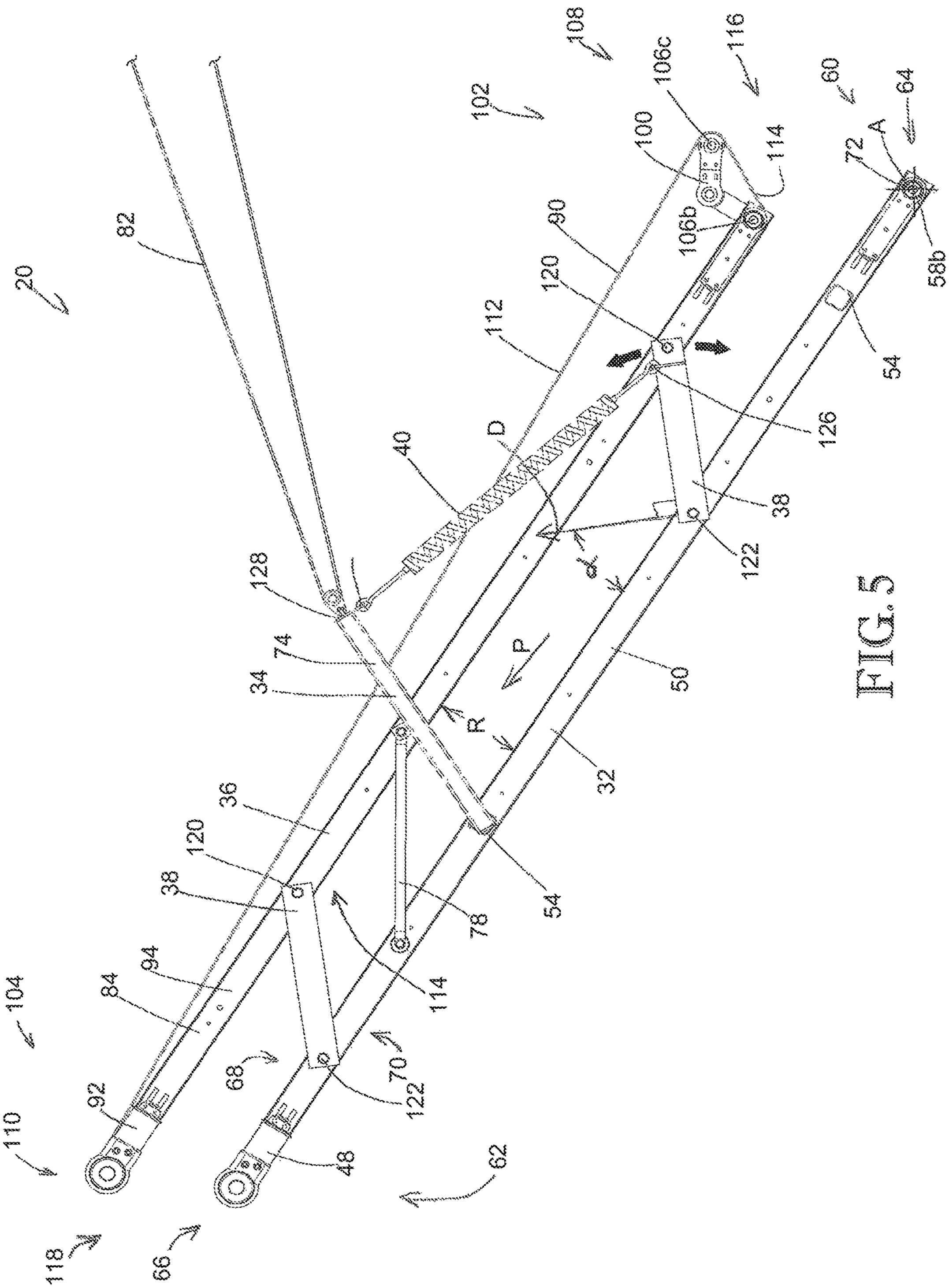
FIG. 5 is a side elevation of the conveyor assembly shown in FIGS. 1-4, showing the upper belt conveyor in an intermediate position and supported by the links and springs.
Figure 6:
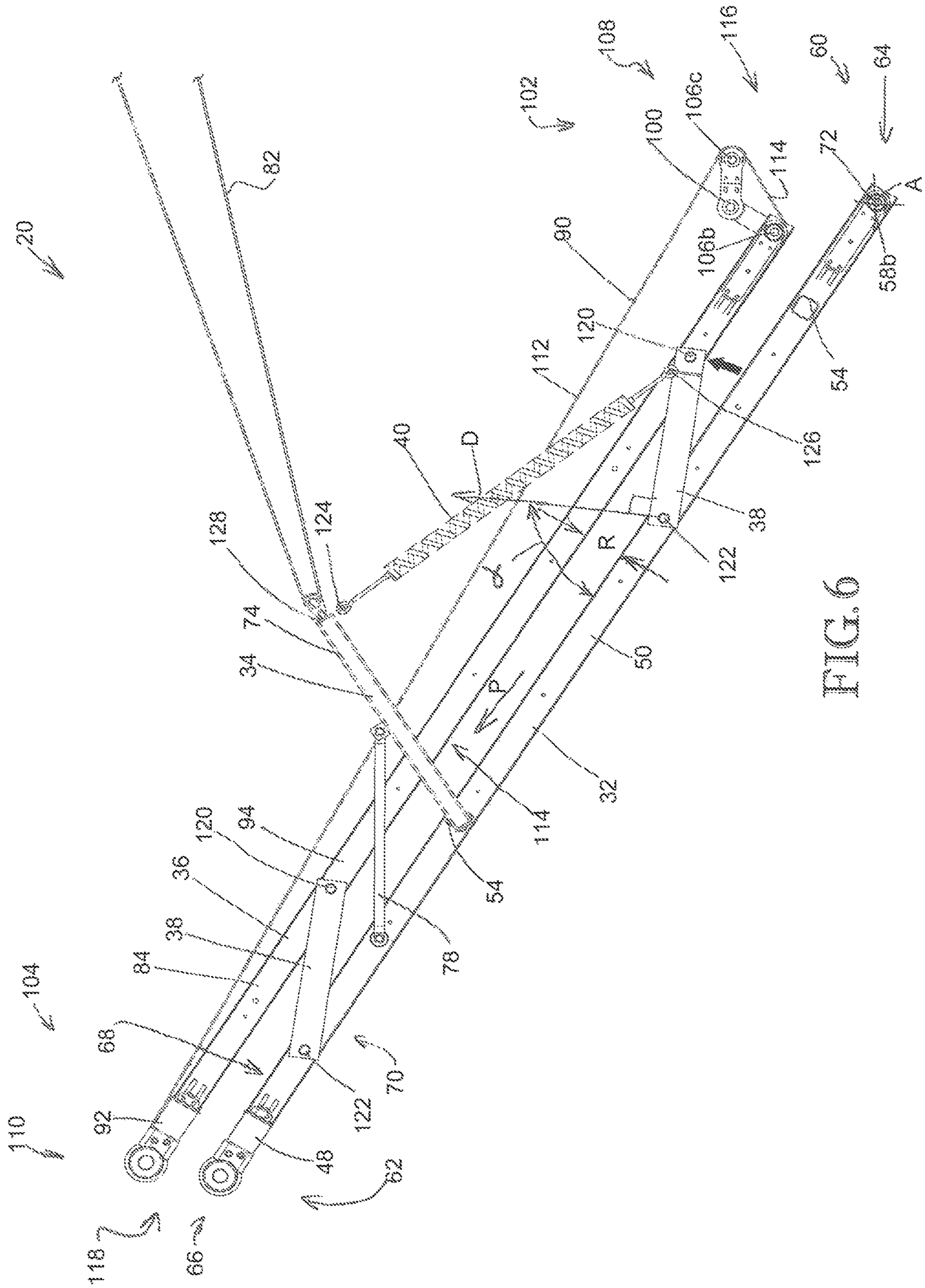
FIG. 6 is a side elevation of the conveyor assembly similar to FIG. 5, but showing the upper belt conveyor shifted downwardly toward the lower belt conveyor.
Figure 7:
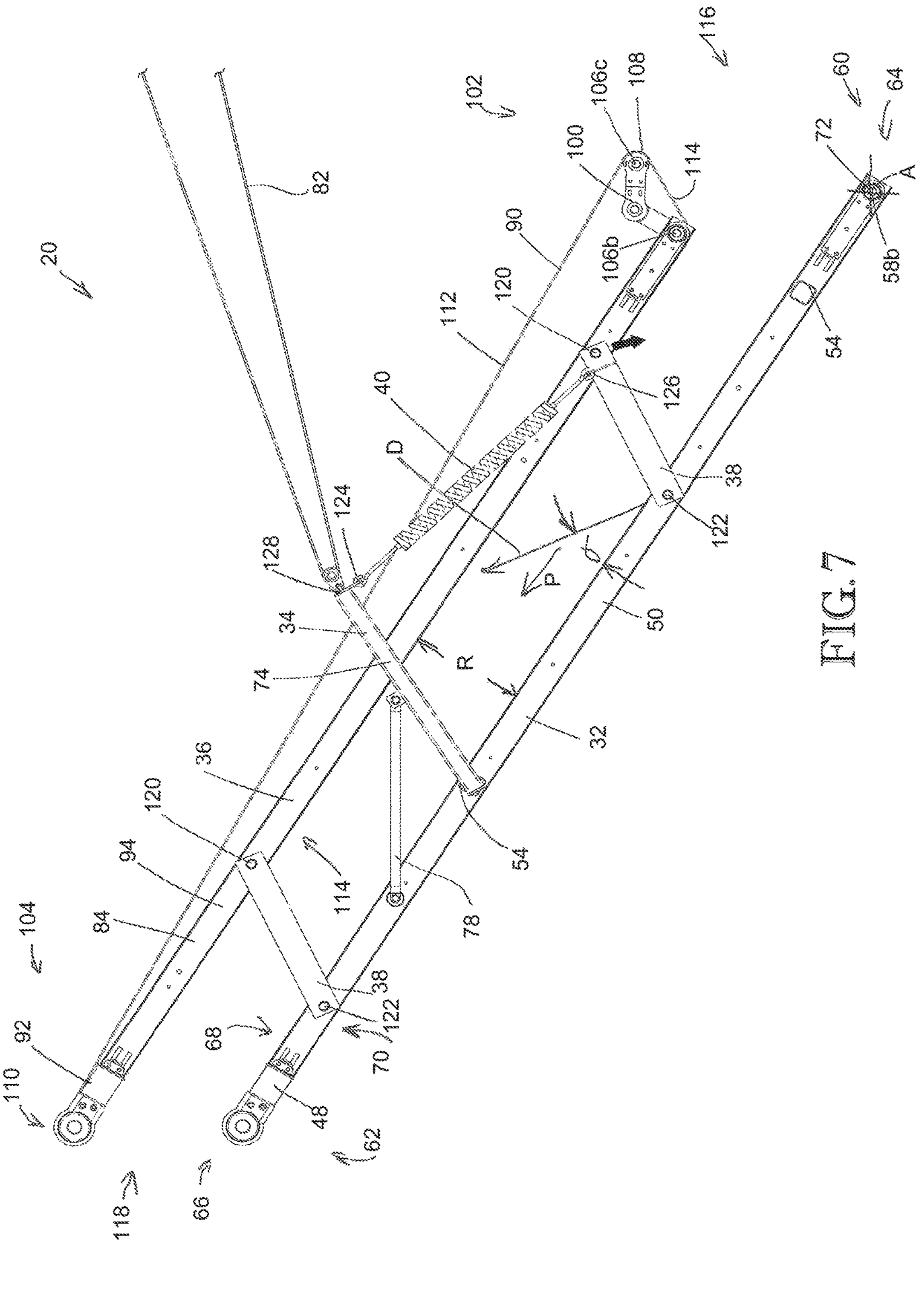
FIG. 7 is a side elevation of the conveyor assembly similar to FIG. 5, but showing the upper belt conveyor shifted upwardly away from the lower belt conveyor.

Turning to FIGS. 5-7, the conveyor assembly 20 preferably has four links that interconnect the conveyor frames 84, 42, with two links 38 on each side of the conveyor assembly 20. The illustrated links 38 are substantially identically shaped. Also, the links 38 are preferably mounted so as to be generally parallel to one another. The depicted links 38 cooperate with the conveyor frames 84, 42 to provide a four-bar linkage that controls and permits shifting movement of the upper belt conveyor 36 relative to the lower belt conveyor 32. Preferably, the depicted linkage arrangement permits the upper belt conveyor 36 to move along the upright direction D transverse to the longitudinal conveyor path P. The upright direction D and the conveyor path P cooperatively define a conveyor shift angle $\alpha$.

The links 38 are configured so that the upright direction D changes as the conveyors 32, 36 move relative to one another, with the conveyor shift angle $\alpha$ changing accordingly. For instance, when the conveyors 32, 36 are relatively close together (i.e., the run spacing dimension R is small), the conveyor shift angle $\alpha$ is relatively large (see FIG. 6). When the conveyors 32, 36 are relatively close together (i.e., the run spacing dimension R is large), the conveyor shift angle $\alpha$ is relatively small (see FIG. 7). For the illustrated conveyor assembly 20, the conveyor shift angle $\alpha$ is preferably an oblique angle. More preferably, the conveyor shift angle $\alpha$ is an acute angle that ranges between about zero degrees (0°) and about ninety degrees (90°).

However, it will be appreciated that an alternative linkage could be used to shiftably interconnect the upper and lower belt conveyors 32, 36 without departing from the scope of the present invention. For instance, the alternative linkage could include sliding link elements attached to the respective conveyor frames 42, 84, where the link elements are slidably engaged with each other and permit relative sliding movement between the conveyors 32, 36 along a direction transverse to the longitudinal conveyor path P.

The upper belt conveyor 36 is preferably shiftable along the upright direction D as the conveyor belts 46, 90 are driven together so that the opposed runs 68,114 remain in moving engagement with the flow of severed plant material. In particular, the upper belt conveyor 36 shifts to change the run spacing dimension R in response to changes in the amount of severed plant material passing between the opposed runs 68,114. In other words, the upper belt conveyor 36 rides along the flow of severed plant material as the height of the material flow changes. In the illustrated embodiment, the upper belt conveyor 36 has weight that urges the upper belt conveyor 36 downwardly into engagement with the flow of severed plant material. That is, the weight of the upper belt conveyor 36 biases the upper belt conveyor 36 into engagement with the severed plant material as the material passes along the longitudinal conveyor path P.

It has also been found that the illustrated linkage configuration cooperates with the longitudinal movement of the lower run 114 to urge the upper belt conveyor 36 downwardly into engagement with the severed plant material. More particularly, the upper pivot joints 120 of each link 38 are located upstream of the respective lower pivot joint 122. Movement of the lower run 114 urges the upper pivot joints 120 and the upper conveyor belt 90 to move upstream. Any resulting upstream movement of the upper pivot joints 120 causes the links 38 to pivot about the respective lower pivot joints 122 so that the upper belt conveyor 36 shifts downwardly to bias the upper belt conveyor 36 into engagement with the flow of severed plant material. In this manner, the upper belt conveyor 36 applies some downward force to the flow of severed plant material as the upper belt conveyor 36 moves along the path P. This downward force serves to contain and to provide some compression of the severed plant material.

The illustrated springs 40 are preferably used to apply a generally upward force to the upper belt conveyor 36. Each spring 40 comprises a tension spring and presents upper and lower ends 124,126. Each spring is connected at the upper end 124 to an upper margin 128 of the yoke 34 and at the lower end 126 to the upper belt conveyor 36. When applying an upward force to the upper belt conveyor 36, the springs 40 urge the upper belt conveyor 36 away from the lower belt conveyor 32. By applying an upward force to the upper belt conveyor 36, the springs 40 urge the upper belt conveyor 36 away from the lower belt conveyor 32.

It has been found that the use of springs 40 to apply the upward force to the upper belt conveyor 36 serves to counteract at least some of the weight of the upper belt conveyor 36. In this manner, the springs 40 are employed so that the upper belt conveyor 36 applies suitable downward pressure to contain the flow of severed plant material without unduly compressing the material.

The springs 40 are preferably used to apply an upward force to the upper belt conveyor 36. However, it is within the scope of the present invention where one or more springs 40 are used to apply a downward force to the upper belt conveyor 36. Furthermore, the springs 40 could be adjustably configured to selectively provide either an upward or downward force to the upper belt conveyor 36.

The illustrated springs 40 are preferably mechanical tension springs. However, the principles of the present invention are applicable where the conveyor assembly 20 uses an alternative type of spring. For instance, the conveyor assembly 20 could use an alternative mechanical spring (e.g., a torsion spring). Also, the conveyor assembly 20 could use springs utilizing compressible gas (e.g., where the conveyor assembly 20 has a hydraulic system including a hydraulic cylinder and an accumulator).

Preferably, the illustrated spring arrangement operates to control the position of the belt conveyors 32, 36 relative to one another. Further, the springs 40 are preferably manually adjustable by the operator to control the amount of compression applied to the severed plant material. However, it will be appreciated that one alternative to the spring arrangement could include a motorized conveyor adjustment mechanism to provide powered adjustment of one or both of the belt conveyors 32, 36. For instance, the conveyor assembly 20 could include various types of conventional powered motors (such as an electric motor, hydraulic motor, or a pneumatic motor) to adjust the position of the belt conveyors 32, 36 relative to one another.

The conveyor assembly 20 is preferably configured so that the lower belt conveyor 32 is attached directly to the yoke 34 and cooperatively supported by the pivot joint 72, yoke 34, and winch 80. Furthermore, the upper belt conveyor 36 is supported above the lower belt conveyor 32 by the links 38 and springs 40. However, it is within the ambit of the present invention where the conveyors 32, 36 are alternatively supported. For instance, the conveyor assembly 20 could be configured so that the upper belt conveyor 36 is attached directly to the pivot joint 72 and the yoke 34. In such an alternative configuration, the lower belt conveyor 32 could be attached to and supported below the upper belt conveyor 36 by an alternative spring mechanism.

Yet further, it is within the ambit of the present invention where the lower belt conveyors 32, 36 are both shiftably mounted so as to be shiftable vertically relative to the yoke 34. For instance, in one alternative embodiment, the illustrated conveyors 32, 36 could both be shiftable at the same time by a spring arrangement so that the illustrated conveyors 32, 36 are both biased toward one another.

Again, the illustrated conveyor assembly 20 is preferably used with the windrower 22 to cooperatively provide the self-propelled silage cutting vehicle 30. As will be described, the conveyor assembly 20 is operable to receive the severed plant material created by and gathered from the windrower 22, transport the severed plant material along the conveyor path P, and discharge a flow of the severed plant material from the outlet opening 118 into a storage bin B of a material hauling vehicle V adjacent to the windrower 22 (see FIG. 2). While the windrower 22 is advanced along the ground G to harvest the plant material, the hauling vehicle V is preferably a self-propelled vehicle advanced alongside the windrower 22 so that the storage bin B receives the discharged flow of severed plant material from the conveyor assembly 20.

The conveyor assembly 20 is shiftably mounted to the windrower 22 to swing between stored and deployed positions. Further, the conveyor assembly 20 is mounted to extend laterally outboard of the chassis 24. In particular, the lower conveyor frame 42 is pivotally mounted relative to the powered chassis 24 at the fore-and-aft pivot joint 72. The pivot joint 72 permits the conveyor assembly 20 to swing between the stored and deployed positions. In the deployed position, the conveyor assembly 20 preferably extends laterally so that the outlet opening 118 is spaced laterally outboard of the chassis 24. More preferably, the conveyor assembly 20 is located in the deployed position so that the outlet opening 118 is spaced laterally outboard from the header 28. This positioning of the conveyor assembly 20 permits the hauling vehicle V to be spaced laterally from the windrower 22 while being advanced across the ground G with the windrower 22. However, for some aspects of the present invention, the conveyor assembly 20 could be deployed so that the outlet opening 118 is located within the lateral extent of the header 28.

The pivot joint 72 is preferably positioned longitudinally between front and back wheels 130,132 of the powered chassis 24. Furthermore, the pivot joint 72 is also located so that the inlet opening 116 of the illustrated conveyor assembly 20 is positioned laterally outboard from the center line of the chassis 24. Again, the conveyor assembly 20 is deployed so that the outlet opening 118 is spaced laterally outboard from the header 28.

However, it is within the ambit of the present invention where the conveyor assembly 20 is alternatively located and/or alternatively oriented relative to the chassis 24 to receive and discharge severed plant material. For instance, the conveyor assembly 20 could be positioned rearwardly of the back wheels 130 to receive the severed plant material. In such a rearward location, instead of extending laterally relative to the windrower 22, the conveyor assembly 20 could also extend rearwardly (i.e., in a rearward direction relative to the windrower 22) from the inlet opening 116 to the outlet opening 118 to discharge severed plant material in a generally rearward direction. For example, where a material hauling vehicle follows closely behind the windrower 22 (e.g., where the windrower 22 tows a wheeled trailer behind the chassis 24), the conveyor assembly 20 could extend rearwardly to transport severed plant material rearwardly and upwardly toward the storage bin of the hauling vehicle. Similarly, the conveyor 20 could extend both laterally and in a forward direction or a rearward direction.

Furthermore, it will be appreciated that the conveyor assembly 20 could be shiftably mounted to the chassis 24 by structure other than the pivot joint 72. For instance, the vehicle 30 could have an alternative pivot joint structure to support the conveyor assembly 20. The conveyor assembly 20 could also be slid ably mounted relative to the chassis 24 (e.g., where the conveyor assembly 20 slides into and out of a storage position located underneath the chassis 24).

Turning to FIG. 2, the vehicle 30 preferably includes a conveyor 134 that receives severed plant material from a header outlet 136 of the header 28 directs the severed plant material toward the inlet opening 116 of the conveyor assembly 20. The conveyor 134 preferably includes a conventional belt conveyor with a frame (not shown) and rollers (not shown) carried by the frame. The conveyor 134 also includes an endless conveyor belt that is supported on the rollers and presents an upper run 138. Additional features of the conveyor 134 are disclosed in U.S. Pat. No. 6,415,590, issued Jul. 9, 2002, entitled DOUBLE WINDROW ATTACHMENT LIFT MECHANISM FOR HARVESTERS, which is hereby incorporated in its entirety by reference herein. However, it will be appreciated that the conveyor 134 could be alternatively configured without departing from the scope of the present invention.

In the illustrated embodiment, a forward end 134*a* of the conveyor 134 is located below and rearwardly of the header outlet 136. The conveyor 134 preferably extends at an oblique angle relative to the forward direction F so that a rearward end 134*b* of the conveyor 134 is located adjacent to the inlet opening 116.

Adjacent to the rearward end 134*b* of the conveyor 134, the vehicle 30 also includes a sheet metal structure 140 secured underneath the powered chassis 24 (see FIG. 2). The structure 140 includes a side wall and a lower pan. The lower pan extends below the rearward end 134*b* and adjacent to the inlet opening 116. The side wall projects upwardly from the lower pan to engage material supported by the pan and to restrict material from falling onto the ground G. The side wall extends from adjacent an inboard corner of the rearward end 134*b* to a location adjacent a rearward corner of the conveyor 134. The structure 140 is operable to direct severed plant material from the rearward end 134*b* of the conveyor 134 to the inlet opening 116 of the conveyor assembly 20. Thus, the conveyor 134 and the structure 140 cooperatively provide a transfer path T between the header outlet 136 and the inlet opening 116.

While the conveyor 134 is preferably used to transfer severed plant material between the header outlet 136 and the inlet opening 116, it is within the ambit of the present invention where the severed plant material is alternatively conveyed. For instance, the vehicle 30 could include an alternative conveyor mechanism to transfer the material from the header outlet 136 to the inlet opening 116. In one such alternative embodiment, the vehicle could include two belt conveyors (each similar to conveyor 134) positioned in series (i.e., end-to-end) to communicate with each other and cooperatively transfer material. Such conveyors could be positioned to transfer material along the same direction. Alternatively, the conveyors could be oriented to move material in different directions. For example, the vehicle 30 could include first and second conveyors positioned in series, with the first conveyor moving material in a rearward direction from the header outlet 136 to the second conveyor, and with the second conveyor moving material in a lateral direction from the first conveyor to the inlet opening 116.

Again, the header 28 discharges the severed plant material from the header outlet 136 and onto the conveyor 134. As the windrower 22 is advanced, the conveyor 134 receives the material and directs the material along the transfer path T toward the inlet opening 116. The structure 140 cooperates with the conveyor 134 to direct and discharge the material into the inlet opening 116. In this manner, the conveyor assembly 20 receives the severed plant material and conveys the severed plant material to the outlet opening 118.

The illustrated conveyor assembly 20 is preferably moved between the stored and deployed positions using a powered drive mechanism. In particular, the winch 80 is used to swing the conveyor assembly 20 into and out of the upright stored position (not shown) where the conveyor assembly 20 extends vertically from the inlet opening 116 to the outlet opening 118. The winch 80 is also used to swing the conveyor assembly 20 into and out of the deployed position (see FIGS. 1 and 2).

When the conveyor assembly 20 is deployed for operation, the winch 80 can also be operated to adjustably position the conveyor assembly 20 to thereby control the lateral and vertical position of the outlet opening 118. For instance, the winch 80 can be used to selectively raise or lower the outlet opening 118 so that severed plant material is discharged into the storage bin B of the hauling vehicle V (see FIG. 2). Any raising or lowering of the conveyor assembly 20 using the winch 80 can be done while the windrower 22 is cutting a swath S of plants, while the windrower 22 is moving but not cutting plants, or while the windrower 22 is stationary.

However, it will be appreciated that an alternative drive mechanism could be used to shift the conveyor assembly 20 between the stored and deployed positions. Furthermore, it is within the ambit of the present invention where the conveyor assembly 20 is moved manually between the positions (e.g., where the drive mechanism includes a manually-powered winch).

In operation, the vehicle 30 is prepared for cutting the swath S of forage plants by deploying the conveyor assembly 20 from the stored position to the deployed position using the winch 80. When the conveyor assembly 20 is deployed for use, the operator can also use the winch 80 to adjustably position the conveyor assembly 20, e.g., to position of the outlet opening 118 relative to the adjacent hauling vehicle V.

As the windrower 22 is advanced to cut the swath S of forage plants, the header 28 discharges the severed plant material from the header outlet 136 and onto the conveyor 134. The conveyor 134 and structure 140 cooperatively direct the material along the transfer path T toward the inlet opening 116.

The conveyor assembly 20 preferably receives and transports a flow of severed plant material along the conveyor path P from the inlet opening 116 to the outlet opening 118. In particular, the opposed runs 68,114 cooperatively engage and transport the material. The upper belt conveyor 36 is shiftable so that the opposed runs 68,114 remain in moving engagement with the flow of severed plant material as the amount of severed plant material passing between the opposed runs 68,114 varies.

As the windrower 22 is advanced to cut the swath S of forage plants, the hauling vehicle V is positioned alongside the windrower 22 so that the bin B receives the flow of severed plant material discharged from the conveyor assembly 20. Once the use of the conveyor assembly 20 is complete, the winch 80 is used to return the conveyor assembly 20 to the stored position.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A windrower operable to be advanced along a ground surface of a field to cut a forage plant crop and to transport a flow of severed plant material to a location spaced laterally from the windrower, said windrower comprising:

a header supported to sever the forage plant crop and discharge the severed plant material;

a dual conveyor assembly located rearwardly of the header to collect severed plant material and transport a flow of severed plant material to the location, said dual conveyor assembly including upper and lower conveyors, each of the upper and lower conveyors including a conveyor frame, an endless conveyor element, and rotatable supports supported by the respective conveyor frame spaced along a longitudinal conveyor path and entrained by the respective endless conveyor element, said dual conveyor assembly further including a linkage pivotally attached to the upper and lower conveyor frames at respective upper and lower pivot joints and at least one motor drivingly connected to a driven one of the rotatable support shafts configured to drive at least one of the endless conveyor elements, wherein said endless conveyor elements cooperatively define inlet and outlet openings of the dual conveyor assembly, with the opposed runs being driven in a normal downstream direction along the path toward the outlet opening, wherein said dual conveyor assembly presents the outlet opening from which the flow of severed plant material is discharged by the dual conveyor assembly, said dual conveyor assembly extending laterally so that the outlet opening is spaced laterally outboard of the header, and wherein said dual conveyor assembly further comprises a conveyor support yoke attached to and supporting the lower conveyor frame and a drive mechanism configured to pivot the endless conveyor elements about the lower pivot joint to adjustably position the outlet opening of the endless conveyor elements relative the ground surface, said endless conveyor elements defining vertically spaced opposed runs that define the longitudinal conveyor path therebetween, with the opposed runs operable to be driven together to move the flow of severed plant material along the path, wherein said linkage shiftably interconnects the conveyor frames and permits relative shifting movement therebetween along an upright direction such that at least one of said opposed runs is shiftable relative to the other opposed run in the upright direction, while the runs are driven together, such that the opposed runs remain in moving engagement with the flow of severed plant material as the amount of severed plant material passing between the opposed runs varies.

2. The windrower as claimed in claim 1, wherein said rotatable supports of each conveyor support opposite end margins of the respective endless conveyor element, and said opposed runs extend along the path between the respective end margins.

3. The windrower as claimed in claim 1 wherein said upper conveyor is shiftably supported above the lower conveyor to move along the upright direction.

4. The windrower as claimed in claim 3, wherein said upper conveyor is biased downwardly into engagement with the flow of severed plant material.

5. The windrower as claimed in claim 1, wherein said linkage is pivotally attached relative to the conveyor frames, with the linkage pivoting as the upper conveyor frame shifts along the upright direction.

6. The windrower as claimed in claim 1, wherein said upper pivot joint is located upstream of the lower pivot joint so that movement of an upper one of the opposed runs urges the upper pivot joint and the upper conveyor to move upstream, with any upstream movement of the upper pivot joint causing the linkage to pivot about the lower pivot joint so that the upper conveyor shifts downwardly to bias the upper conveyor element into engagement with the flow of severed plant material.

7. The windrower as claimed in claim 1, wherein said linkage interconnects the conveyor frames so that the upright direction and the longitudinal conveyor path cooperatively define a conveyor shift angle.

8. The windrower as claimed in claim 7, wherein said conveyor shift angle is an oblique angle.

9. The windrower as claimed in claim 3, further comprising a spring attached to the upper conveyor frame to urge the upper conveyor to shift relative to the lower conveyor along the upright direction.

10. The windrower as claimed in claim 9, wherein said spring urges the upper conveyor upwardly away from the lower conveyor.

11. The windrower as claimed in claim 10 wherein said conveyor support yoke projects upwardly above the upper conveyor to present an upper yoke margin, and said spring comprising a tension spring attached to and depending from the yoke adjacent the upper yoke margin, with the tension spring pulling upwardly on the upper conveyor.

12. The windrower as claimed in claim 3 wherein rotatable supports including endmost supports that are rotatably mounted on the upper conveyor frame, with the endmost supports engaging and supporting respective end margins of the upper endless conveyor element.

13. The windrower as claimed in claim 12 wherein said rotatable supports include an intermediate support spaced longitudinally between the endmost supports, with the intermediate support engaging and supporting the opposed run of the upper endless conveyor element.

14. The windrower as claimed in claim 1 wherein said header presents opposite laterally spaced header ends, said dual conveyor assembly presents an inlet opening positioned laterally between the header ends, and said upper and lower conveyors extend laterally between the inlet and outlet openings to with the opposed runs being driven in a normal downstream direction toward the outlet opening.

15. The windrower as claimed in claim 1 wherein the drive mechanism configured to adjustably position the outlet opening is a powered winch configured to raise or lower the outlet opening relative an adjacent storage bin of a hauling vehicle such that the dual conveyor assembly discharges the flow of severed plant material to the adjacent storage bin.

16. The windrower as claimed in claim 1 wherein the dual conveyor assembly includes a first motor drivingly connected to a driven one of the rotatable support shafts configured to drive the upper endless conveyor element and a second motor drivingly connected to a driven one of the rotatable support shafts configured to drive the lower endless conveyor element.

* * * * *